Dec. 11, 1923.
S. A. DOBYNE
BEARING SUPPORT
Filed July 19, 1918
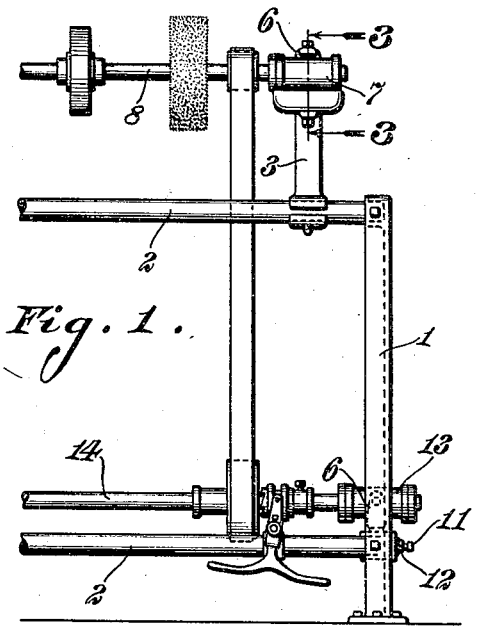
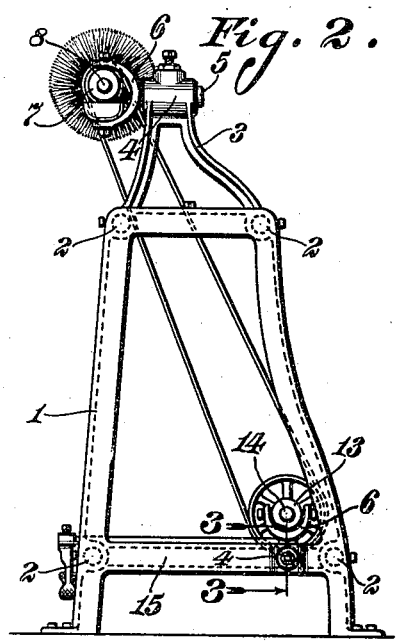
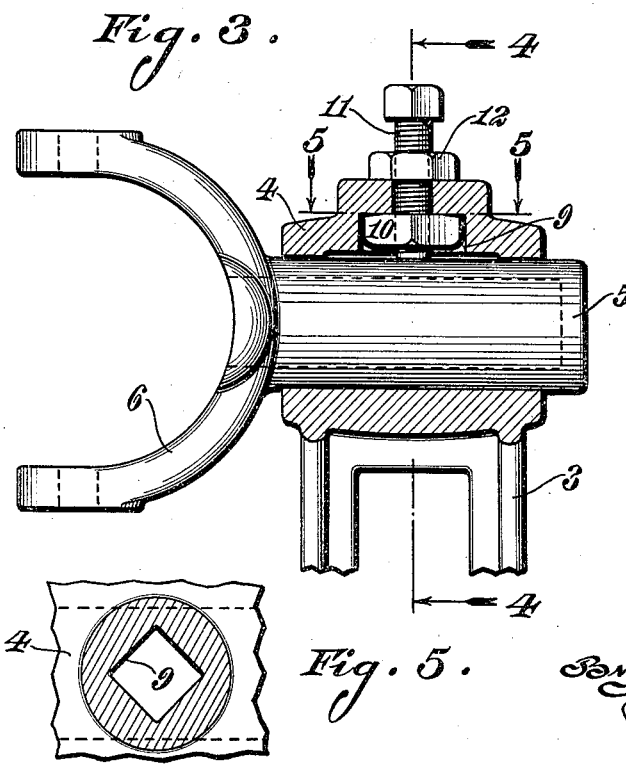
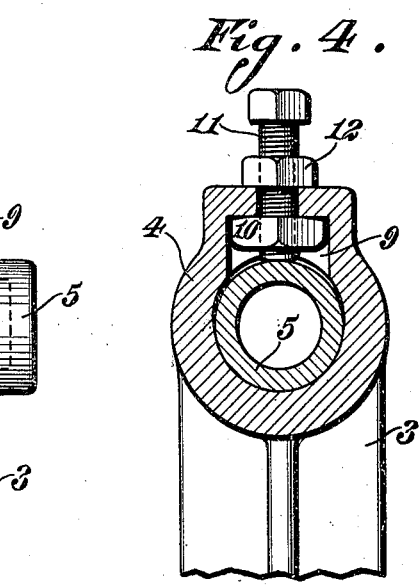
Inventor:
STEPHEN A. DOBYNE, Patented Dec. 11, 1923.

1,477,250

UNITED STATES PATENT OFFICE.

STEPHEN A. DOBYNE, OF ST. LOUIS, MISSOURI, ASSIGNOR TO CHAMPION SHOE MACHINERY COMPANY, OF ST. LOUIS, MISSOURI, A CORPORATION OF MISSOURI.

BEARING SUPPORT.

Application filed July 19, 1918. Serial No. 245,732.

*To all whom it may concern:*

Be it known that I, STEPHEN A. DOBYNE, a citizen of the United States, and residing at St. Louis, Missouri, have invented the new and useful Improvement in Bearing Supports, of which the following is a specification.

This invention relates to bearing supports.

One of the objects of this invention is to provide a bearing support which is simple in construction, cheap to manufacture and reliable in its action.

Another object is to provide a novel means for clamping a bearing carrier in its base.

Further objects will appear from the detail description taken in connection with the accompanying drawing, in which:

Figure 1 is a front elevation of a machine illustrating an embodiment of this invention;

Figure 2 is an end elevation;

Figure 3 is a section on the line 3—3, Figures 1 and 2;

Figure 4 is a section on the line 4—4, Figure 3; and,

Figure 5 is a section on the line 5—5, Figure 3.

Referring to the accompanying drawing, 1 designates an end frame of the machine which is, in this case, a shoe finishing machine there being a series of these end frames connected by cross-members 2, while mounted upon the upper cross-member is a bracket 3. This bracket is provided with a boss 4, which is recessed providing a socket, to receive the shank 5 of a forked carrier 6, which is adapted to support the bearing 7 of a shaft 8. The bearing carrier thus overhangs the bracket or boss 3.

The boss 4 is recessed as shown at 9, to form an angular seat for a nut 10. This nut is threaded to receive a clamping screw 11 provided with a lock nut 12. In the process of manufacture, the angular recess 9 is cast and is left unfinished, this recess being made sufficiently large to conveniently receive the nut 10. In assembling, the nut is placed in this recess prior to the insertion of the shank 5, and the clamping screw 11 is threaded into this nut. Thus, when the shank has been placed in position in its boss 4, the clamping screw can be tightened to firmly clamp the shank in position in the boss.

The same construction can be used for supporting the bearing 13 of the shaft 14, and similar parts have been designated by similar reference characters. In this construction, the cross-member 15 of the end frame or base 1 is provided with a boss 4, provided with similar means for clamping the carrier in position.

It will thus be seen that this invention provides a very simple and economical means for supporting and retaining the carrier in its base. With this construction, tapping of the supporting boss is avoided and the cost of construction can, therefore, be considerably lessened. Moreover, this provides for the use of a steel or malleable iron nut, which has a much stronger thread than a cast thread has as is the case if the cast base itself is threaded.

It is obvious that various changes may be made in the detail of construction without departing from the spirit of this invention; it is, therefore, to be understood that this invention is not to be limited to the specific construction shown and described.

Having thus described the invention, what is claimed is:

1. A bearing support, comprising, a base having a transversely disposed socket adapted to receive a forked shaft hanger and provided with an interior angular recess, a nut held in said recess against rotation, and a clamping screw passing loosely through said base, into said socket and threaded into said nut.

2. A bearing support, comprising, a base having a transversely disposed socket adapted to receive a forked shaft hanger and which has cast therein an interior angular recess, a nut held in said recess against rotation, and a clamping screw passing loosely through said base, into said socket and threaded into said nut.

3. A bearing support, comprising, a base having a transversely disposed socket adapted to receive a forked shaft hanger and provided with an interior angular recess, a nut held in said recess against rotation, a clamping screw passing loosely through said base, into said socket and threaded into said nut, and a carrier having a shank loosely fitting said socket and clamped by said screw.

In testimony whereof I affix my signature this 6th day of October, 1917.

STEPHEN A. DOBYNE.